United States Patent
Khatri et al.

(10) Patent No.: US 9,085,711 B1
(45) Date of Patent: Jul. 21, 2015

(54) PRODUCT AND PROCESS FOR LOW GLOSS COATING

(75) Inventors: Rajesh A. Khatri, Georgetown, KY (US); Uschi M. Graham, Lexington, KY (US)

(73) Assignee: Topasol, LLC, Lexington, KY (US)

(*) Notice: Subject to any disclaimer, the term of this patent is extended or adjusted under 35 U.S.C. 154(b) by 803 days.

(21) Appl. No.: 12/806,452

(22) Filed: Aug. 12, 2010

Related U.S. Application Data (60) Provisional application No. 61/274,023, filed on Aug. 12, 2009.

(51) Int. Cl.
| | |
|---|---|
| C09D 7/00 | (2006.01) |
| C09D 183/02 | (2006.01) |
| C09D 183/04 | (2006.01) |
| C09D 183/06 | (2006.01) |
| C09D 183/08 | (2006.01) |
| C08K 3/36 | (2006.01) |
| B05D 5/02 | (2006.01) |

(52) U.S. Cl.
CPC ............... C09D 183/02 (2013.01); C08K 3/36 (2013.01); B05D 5/02 (2013.01); *C09D 7/005* (2013.01); *C09D 183/04* (2013.01); *C09D 183/06* (2013.01); *C09D 183/08* (2013.01)

(58) Field of Classification Search
CPC .... C09D 7/005; C09D 183/02; C09D 183/04; C09D 183/06; C09D 183/08; C08K 3/36; B05D 5/02
USPC .......................... 524/212–214, 261, 492–494
IPC ........................................................ B05D 5/02
See application file for complete search history.

(56) References Cited

U.S. PATENT DOCUMENTS

| | | | | |
|---|---|---|---|---|
| 4,672,092 A | * | 6/1987 | Whitehouse | 525/108 |
| 6,927,251 B2 | * | 8/2005 | Rische et al. | 524/591 |

(Continued)

FOREIGN PATENT DOCUMENTS

| | | | | |
|---|---|---|---|---|
| JP | 2000129448 A | * | 5/2000 | |
| JP | 2003193027 A | * | 7/2003 | |
| JP | 2003300009 A | * | 10/2003 | |

OTHER PUBLICATIONS (PPG Silica Products:Lo-Vel Flatting Agents Non-Treated, 2007, 2 pages).*
Momentive (Silquest A-187 Technical Data Sheet, May 2013, 3 pages).*

(Continued)

*Primary Examiner* — Brieann R Fink
(74) *Attorney, Agent, or Firm* — Carrithers Law Office, PLLC (57) ABSTRACT

This disclosure describes a composition and a process for forming silica particles as either a neat film or in polymers during curing at atmospheric pressure and room temperature or thermal or radiation curing. The process includes formation of a nanoparticle precursor solution comprising a small amount of a particulate matting agent such as a silica powder matting agent in combination with a low viscosity liquid silica precursor materials such as a liquid alkoxide, alkoxysilane, tetraethylorthosilicate, sol gel silica or combinations thereof. The precursor solution can be applied to surfaces either neat to form a film upon heating or mixed into a curing polymer resin. The precursor has low viscosity so that it can be easily mixed into the resin, but during curing of the resin, the precursor rapidly forms particles, usually less than 10 microns in size depending on the concentration of the precursor used and the polymer composition.

10 Claims, 4 Drawing Sheets

(56) References Cited

U.S. PATENT DOCUMENTS

2007/0084379 A1* 4/2007 Balazs et al. ............... 106/31.05
2008/0255288 A1 10/2008 Anderson et al.
2008/0268229 A1 10/2008 Lee et al.
2008/0316602 A1 12/2008 Kameshima et al.
2009/0074705 A1 3/2009 Graham et al.
2010/0035026 A1* 2/2010 Oscar et al. ............... 428/195.1

OTHER PUBLICATIONS

Machine translated English equivalent of JP 2003-193027 (Jul. 2003, 15 pages).*
Machine translated English equivalent of JP 2000-129448 (May 2000, 12 pages).*
Machine translated English equivalent of JP 2003-300009 (Oct. 2003, 11 pages).*

* cited by examiner

PRODUCT AND PROCESS FOR LOW GLOSS COATING

CROSS REFERENCE TO RELATED APPLICATIONS

This application claims priority from Provisional Application Ser. No. 61/274,023 filed on Aug. 12, 2009 which is incorporated by reference herein.

FIELD OF THE INVENTION

The present invention relates generally to coatings with low gloss and more specifically it relates to an additive chemistry to the coating mixture that sharply reduces gloss of the coating while maintaining appearance and maintaining or improving other coating properties including hardness, corrosion protection, scratch resistance and UV protection.

BACKGROUND OF THE INVENTION

Description of the Related Art

It can be appreciated that there are a variety of materials and methods, or processes, for reducing the gloss and reflectance of coatings that have been in use for some years. For example, U.S. Patent Application 2008/0316602 teaches the use of a binder matrix with two types of organic particles of different sizes. By combining the two types of particles an antiglare film is produced. U.S. Patent Application 2008/0268229 teaches production of an anti-reflective and anti-fogging superhydrophilic coating by a layer by layer application of pure $TiO_2$ nanoparticles and $SiO_2$ nanoparticles. U.S. Patent Application 2008/0255288 teaches a method of producing a low gloss coating by combining a curing agent and a film-forming fluoropolymer with fillers and or nanoscale particles. Anti-reflective coatings with low refractive index are used on solar cells. Some low gloss coatings include silica nanoparticle coatings made by a colloidal deposition process.

The main problem with the aforementioned materials and methods of forming low gloss coatings is that relatively large amounts of particles (>5%) are needed in order to achieve gloss reduction. Either microparticles of defined size range or nanoparticles or a mixture of particle sizes are added into resin blends (current ex-situ process) and various technical problems need to be solved. Generally the particles must be chemically treated to mix with the resins; they thicken the resins unacceptably so that there are practical limitations to their use. Mixing usually requires high energy input and problems need to be overcome such as agglomeration, settling, uneven dispersion, poor micro- or nano-particle/resin interface and others. Handling micro- or nano-particle powders is also environmentally undesirable as they have potential toxicity, tend to become air-borne and remain suspended easily in the air, and stick to myriad surfaces.

In these respects, the current invention substantially improves on the conventional concepts and designs of the prior art, and in so doing provides a material and a process primarily developed for its practicality for use in forming low gloss coating at a reasonable cost while minimizing the use of micro- or nano-particle powders.

SUMMARY OF THE INVENTION

A composition and a process is described for forming silica particles as either a neat film or in polymers during curing at atmospheric pressure and room temperature or thermal or radiation curing. The inventive process includes formation of a micro- or nano-particle precursor solution comprising a small amount of a particulate matting agent such as a silica powder matting agent in combination with a low viscosity liquid silica precursor composition such as a liquid alkoxide, alkoxysilane, tetraethylorthosilicate, sol gel silica or combinations thereof. The precursor solution can be applied to surfaces either neat to form a film upon curing for example by heating, or mixed into a curing polymer resin, for example polyurethane resins, derivitized polyurethanes, polyurethane acyrlates and combinations thereof. A strong synergistic effect occurs such that additional silica particles form from TEOS or sol-gel during curing of the resin at an accelerated rate. The precursor has low viscosity so that it can be easily mixed into the resin, but during curing of the resin, the precursor rapidly forms particles, usually less than 10 microns in size and often in the size range of 1 to 40 and preferably from 20-40 nm, and even as small 2 nm, depending on the concentration of the precursor used and the exact polymer composition. The resultant silica particle-containing polymer resins have a wide range of utility for making coatings and other polymeric materials with properties potentially useful for reduced gloss optical coatings and other applications.

In view of the foregoing disadvantages inherent in the known types of low gloss coatings made by mixing particles in polymers now present in the prior art, the present invention provides a new precursor and process for forming low gloss or anti-reflective films or coatings containing silica particles. The precursor forms the said film/coating either when heated on a substrate as a neat precursor, or when added to resins and subsequently cured as a mixture, either at atmospheric pressure and room temperature or with thermal or UV curing, or in concept any type of curing process, but preferably a UV curing process. The precursor in its preferred version is formed by adding up to about 40% and preferably from about 5-40% of a known matting agent, such as a silica matting agent available from Degussa Acematt into a liquid that can form silica particles, such as alkoxysilane, e.g. TEOS (tetraethylorthosilicate), or a sol-gel silica formed by the usual methods of preparing sol-gels. A less preferred precursor is the combination of an alkoxide with a sol gel but without the particulate matting agent. The precursor can be used in a process for creating transparent films on substrates by coating the substrate with the neat precursor or solvent dilutions of the precursor and heating. Importantly the precursor can also be used in a process for creating a polymer coating with silica particles of controlled small size and excellent dispersion, in polyurethane, polyacrylate, and in concept any type of known resin coating in which the precursor can be solubilized. Furthermore, a sufficient concentration and dispersion of the silica particles can be obtained in order to give the coating a microscopically rough, low gloss appearance. Remarkably, sufficient particles can be formed during radiation curing at very short times, e.g. a low gloss coating of only 8 gloss units on paper or less than 100 gloss units on aluminum was formed in a 30 second ultraviolet radiation cure (mw/cm2—it takes less than 3 seconds in commercial UV cure equipment). The overall gloss was reduced by one half up to less than 10% of the value for the neat resin. The resin containing the silica particle precursor can then be used to form polymeric film or composites with a myriad of uses, including coatings for paper, for wind turbine blades, aircraft coatings, solar cells, automotive coatings, and all types of displays such as plasma display, liquid crystal display, and for any objects or substrate where a low gloss finish is desirable. Optionally a dispersant may be utilized in the present invention.

The general purpose of the present invention, which will be described subsequently in greater detail, is to provide a better, safer method for forming silica particle films either neat or in polymers. The invention has many of the advantages of the in-situ nanoparticle formation developed by TOPASOL LLC heretofore, U.S. Patent Application 2009/0074705 by Graham et al. incorporated by reference in this patent application, and many novel features that result in a simple method for forming silica particles in polymers which is not anticipated, rendered obvious, suggested, or even implied by any of the prior art, including in-situ nanoparticle formation, either alone or in any combination thereof.

To attain this, the present invention generally consists essentially of formation of a precursor liquid by adding up to 40% and more particularly about 5-40% of a known matting agent, such as a silica matting agent, e.g. non-coated silicas of from 0.1 to 10 and preferably from 2 to 10 microns average size, such as Degussa AceMatt series into a liquid that can form silica particles, such as alkoxysilane, or into a sol-gel silica formed by the usual methods of preparing sol-gels, or into a mixture of alkoxysilane and pre-prepared sol gel. The present invention precursor liquid can be used neat or can consist essentially of a certain amount of a precursor of up to 40% by weight, more preferably from 0.01 to 40% by weight, and more preferably from 5 to 40% by weight added into a polymer resin that assists in-situ formation (from the precursor) of silica particles while the resin cures. Suitable resins include polyurethane resins, derivitized polyurethanes, polyurethane acrylates, acrylic resins, polyvinyl esters, polyvinyl chlorides, polyesters and combinations thereof.

Thus, a preferred embodiment of the present invention provides a low gloss coating, consisting essentially of a polymeric resin selected from the group consisting of a polyurethane resin, a derivitized polyurethane resin, a polyurethane acrylate resin, an acrylic resin, a polyvinyl ester resin, a polyvinyl chloride resin, a polyester resin and combinations thereof. Added to the resin is from 0.1 to 40% of a nanoparticles precursor solution consisting essentially of a matting agent comprising from 0.1 to 10 microns average size of a non-coated silica; and a low viscosity liquid silica material selected from the group consisting of an tetraethyllorthosilicate, an alkoxysilane, a tetramethylorthosilicate, a tetrapropylorthosilicate, a tetrabutylorthosilicate, a sol-gel, and combinations thereof. Upon curing said low gloss coating ranges from 8-20 gloss units at an angle of 60 degrees when measured by a Rhopoint NOVO-HAZE hazemeter.

When either the matting agent or the alkoxysilane or the sol-gel are added alone as a precursor, only minimal particle formation and no measurable gloss reduction occurs during curing of the resin, unless large amounts of one of these materials is used. Using the matting agent in combination with either alkoxysilane, sol-gel, or combinations thereof provides a strong synergistic effect resulting in silica particles forming extremely rapidly (<30 sec) during UV curing wherein less than one percent by weight total of the matting agent is in the coating resin.

The use of matting agent alone requires more than 2.5% by weight to achieve a gloss rating of 46, and 5 to 7% of matting agent is needed to achieve the low gloss desired in the target applications (<15 gloss units). The higher concentrations of 5% by weight or more of matting agent unacceptably thickens the resin and the coating requires dilution with a solvent, which is environmentally unacceptable.

Using the precursor of this invention, the particles form in sufficient abundance to provide very low gloss of the resin coating, typically from 8-20 gloss units at an angle of 60 degrees when measured by a Rhopoint NOVO-HAZE hazemeter.

There has thus been outlined, rather broadly, the more important features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction and to the arrangements of the components set forth in the following description. The invention is capable of other embodiments and of being practiced and carried out in various ways. Also, it is to be understood that the phraseology and terminology employed herein are for the purpose of the description and should not be regarded as limiting.

The present invention provides a process for a low gloss polymer coating comprising the steps of selecting a polymeric resin from the group consisting of a polyurethane resin, a derivitized polyurethane resin, a polyurethane acrylate resin, an acrylic resin, a polyvinyl ester resin, a polyvinyl chloride resin, a polyester resin and combinations thereof. A precursor solution is formed by adding a matting agent comprising from 0.1 to 10 microns average size of a non-coated silica to a low viscosity liquid silica material selected from the group consisting of an tetraethyllorthosilicate, an alkoxysilane, a tetramethylorthosilicate, a tetrapropylorthosilicate, a tetrabutylorthosilicate, a sol-gel, and combinations thereof and mixing thoroughly. The precursor solution is added to the resin in an amount of from 0.1 to 40% by weight. The polymeric resin containing the precursor solution is cured producing a low gloss coating ranges from 8-20 gloss units at an angle of 60 degrees when measured by a Rhopoint NOVO-HAZE hazemeter at ambient temperature and pressure, by applying heat, by applying radiation or combinations thereof.

A primary object of the present invention is to provide a simple composition and process for forming silica particles either as neat films or in polymers and polymer coatings that will overcome the shortcomings of the conventional processes.

An object of the present invention is to provide a precursor composition, comprised of silica matting agent in an alkoxysilane, such as tetraethylorthosilicate, for forming silica nanoparticle-containing films and coatings. The films or coatings can be formed from either the neat precursor by heating a film of precursor for a certain time and temperature, or by adding the precursor into polymer resins and curing the resultant mixture of precursor-resin by known curing processes such as at atmospheric pressure and room temperature, thermal curing, and/or radiation curing. An advantage of the precursor is that it has a relatively low viscosity when mixed with the resin compared to direct addition of powders in similar concentration.

Another object is to provide an improved process for forming silica particles in polymers which are coatings resins. The silica particles formed can be more evenly dispersed and may be smaller than can be achieved by mixing of silica powders in the resin. Further it is contemplated that other combinations of known matting agents and metal salts will form particles in resins as well by the current process.

Another object is to provide a simple process for forming silica particles in polymers for making a coating that has properties conveyed by the particles, for example, anti-reflection and low gloss, hardness, scratch resistance and anti-corrosion effect.

Another object is to provide a simple process for forming silica particles in polymers in which the silica particles are combined with trace elements such as rhodium, cobalt, nickel, gold, copper, aluminum, silver, platinum, etc.

Another object is to provide a simple process for forming silica particles in polymers in which the polymers, during curing, aid the formation of silica particles from the silica precursor substrate and in which the curing can be carried out at room temperature and pressure or by any known curing process such as thermal, radiation, or at ambient conditions.

Other objects and advantages of the present invention will become obvious to the readers and experts in the field and it is intended that these objects and advantages are within the scope of the present invention.

To the accomplishment of the above and related objects, this invention may be embodied in the form illustrated in the accompanying examples, attention being called to the fact, however, that the examples are illustrative only, and that changes may be made in the specific construction illustrated.

BRIEF DESCRIPTION OF THE DRAWINGS

A better understanding of the present invention will be had upon reference to the following description in conjunction with the accompanying drawings in which like numerals refer to like parts throughout the several views and wherein:

FIG. 1 is a microphotograph showing a paper surface coated with UV cure resin containing 1% untreated silica matting agent at;

DETAILED DESCRIPTION OF THE INVENTION

Turning now descriptively to the composition and the process, the described examples illustrate a silica precursor composition and a process for forming silica particles in polymers from the precursor. Suitable resins include resins used for coatings or composites such as polyurethane resins, derivitized polyurethanes, polyurethane acyrlates, acrylic resins, polyvinyl esters, polyvinyl chlorides, polyesters and combinations thereof. In theory the precursor can work in any curable resin composition in which it can be solubilized. The precursor composition itself comprises a lesser amount of a known matting agent; e.g. silica matting agent, and a major amount of a liquid chemical which is a precursor for formation of silica particles; e.g. alkoxysilanes such as tetraethylorthosilicate and/or any sol gel composition. The matting agent is itself a silica particle composition, but which as will be explained, has limitations in producing desired coating effects such as anti-reflection and low gloss. The precursor is formed by adding up to 40% and preferably from about 5-40% of a the matting agent, such as a silica matting agent, (for example Degussa TS100 or Degussa AceMatt 3300), into a liquid that can form silica particles such as TEOS (tetraethylorthosilicate) or a sol-gel silica formed by the usual methods of preparing sol-gels or a combination of both. When either the TEOS or the sol-gel are added alone as a precursor, no apparent particle formation takes place and no measurable gloss reduction occurs during curing of the resin, even if large amounts of one of these materials is used. When TEOS and sol-gel are combined together, there is some measurable gloss reduction. When the matting agent alone is added to the resin it also has some benefit if used in relatively large amount, e.g. 5% by weight or more of the matting agent in resin decreases gloss somewhat, but in any larger amounts it unacceptably thickens the resin to a gel or paste consistency, so it can not be used as a coating and/or it would have to be greatly diluted with solvent which would give the coating unacceptably high volatile hydrocarbon content. Furthermore, large amounts of matting agent requires extra process steps of mixing the matting agent into the resin.

Figure 1:
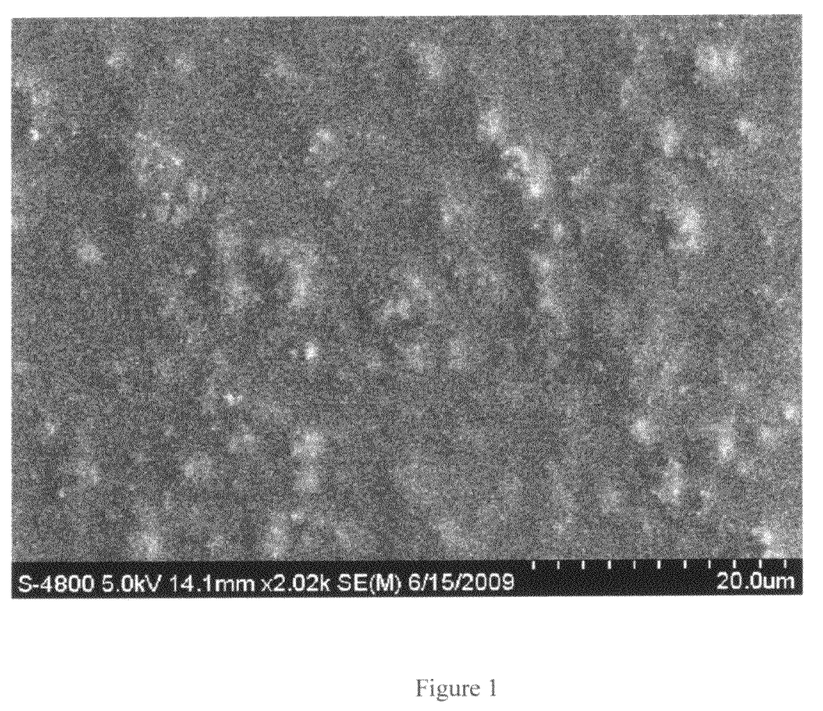
Figure 2:
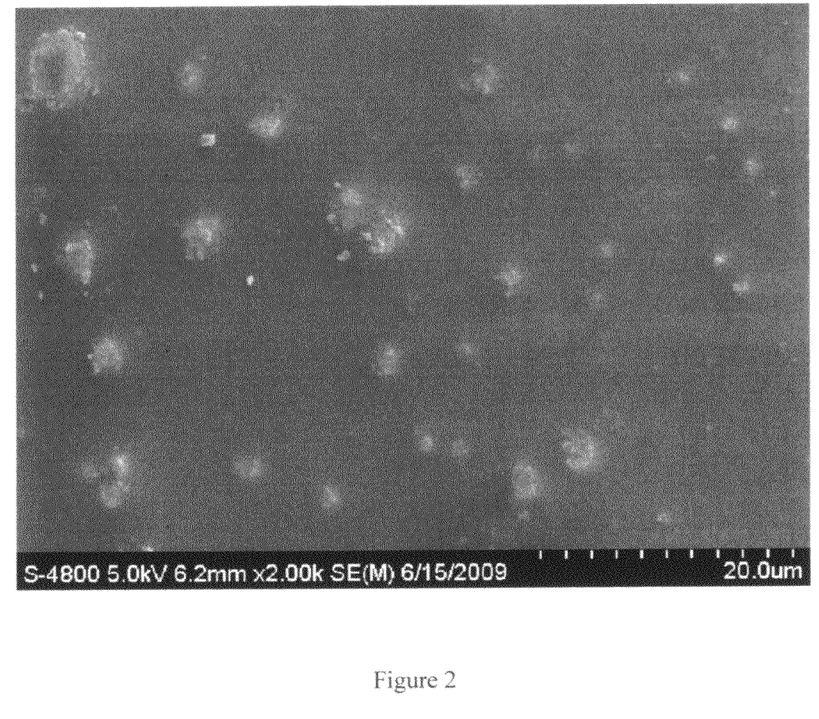
FIG. 2 is a microphotograph showing a paper surface coated with UV cure resin containing 18% precursor of 1% matting agent and TEOS.
Figure 3:
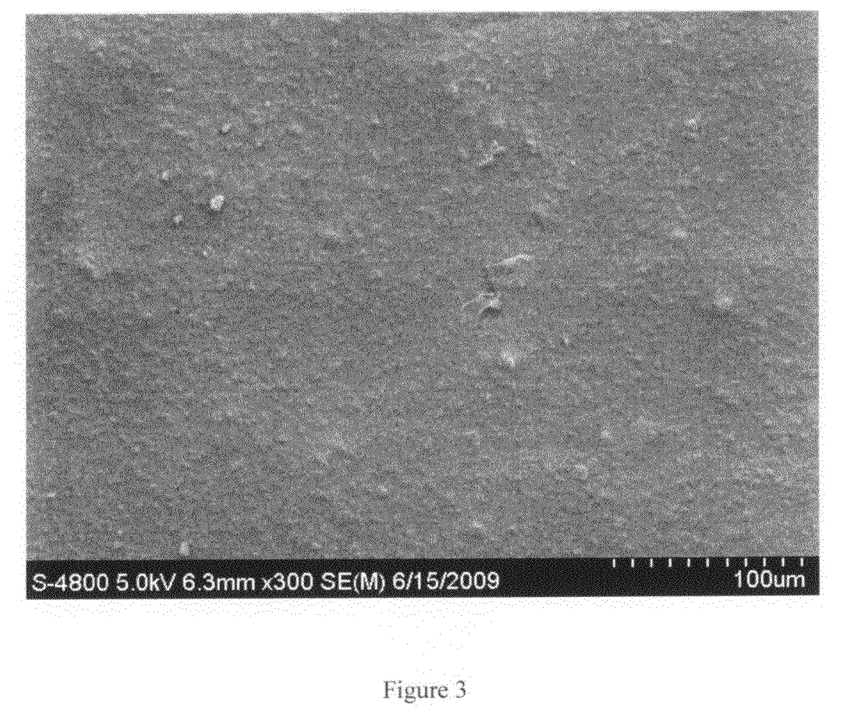
FIG. 3 is a microphotograph showing a paper surface coated with UV cure resin containing 1% untreated silica matting agent.
Figure 4:
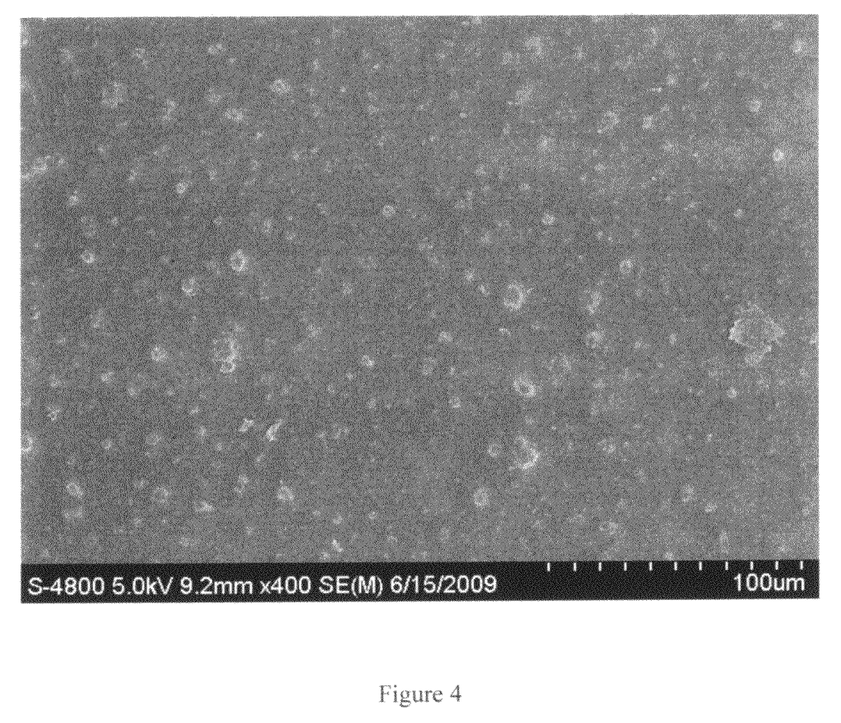
FIG. 4 is a microphotograph showing a paper surface coated with UV cure resin containing 18% precursor of 1% matting agent and TEOS.

While not wishing to be held by any particular theory of why the precursor improves "matting" or reduces gloss, it appears that unexpectedly, when a small amount of matting agent is used in combination with either alkoxysilane, e.g. TEOS, or sol-gel, or a combination of the two, a strong synergistic effect occurs such that additional silica particles form from TEOS or sol-gel during curing of the resin and even will form extremely rapidly (<30 sec mw/cm2) during UV curing. Furthermore, the overall effect on the surface topography of the resin will be a smoother background but with regular larger features, as opposed to irregular surface roughness as shown in FIGS. 1-4. This occurs with less than one percent by weight total of the matting agent in the coating resin. Use of the matting agent alone requires at least 2.5% particle matting agent by weight to achieve a gloss rating of 46, which is still much too high to achieve the low gloss desired in the target applications, (i.e. less than 20 gloss units). Moreover, concentrations of higher than 5 weight percent matting agent unacceptably thickens the resin. Using the precursor of this invention, the particles form in sufficient abundance to provide very low gloss of the resin coating, typically from 8-20 gloss units at an angle of 60 degrees when measured by a Rhopoint NOVO-HAZE hazemeter.

Other low viscosity liquid silica precursor component can be used instead of tetraethylorthosilicate, for example, tetramethyl-, tetrapropyl-, tetrabutyl-orthosilicate and like materials can be used, however, it is desirable to use the lower molecular weight materials to avoid excessive dilution of the resin with hydrocarbon materials that form during the silica particle formation; i.e. the reaction of the TEOS or like material. Likewise, low viscosity sol gels can be used instead of TEOS. Sol gels can be prepared by the usual methods; e.g. a solution of TEOS in ethanol is heated with water made acidic with nitric acid at 60° C. for three hours. Many other types of sol gel are possible and are expected to be effective in this invention, e.g. sol gels made from tetramethylorthosilicate, 3-(glycoxypropyl) trimethoxysilane, etc. Different acids than nitric acid, e.g. hydrochloric acid may also be used to make the sol gel and may have advantage in not yellowing certain resins. Essentially any method of making a low viscosity sol gel is likely to be useful in preparing a companion to the matting agent for precursor to insitu nanoparticle formation.

On the other hand not all liquid silica precursor materials (e.g. TEOS/matting agent) or liquid sol gels/matting agent are desirable or useful precursors. The precursors must be selected to be soluble in the resin or resins in the coating or composite material. For example, polyurethane resin systems are available in a variety of forms, namely, two part resin systems which are non-aqueous and are combined to achieve the final cross-linked polyurethane coating, or as fully reacted latexes of already cross-linked polyurethanes in water, or as fully reacted polyurethane polymer in solvent. For aqueous polymer resins the precursor materials are selected to be soluble in water, for example, TEOS and matting agent or sol gel prepared from TEOS and matting agent. For the nonaqueous polymers we have found that the same precursor has surprisingly good ability to dissolve in the base resin of the two-part polyurethane type resin system, polyacrylate resins, and other resins.

Suitable matting agents useful for this invention include, but are not limited to, small particles proven to produce low glare or anti-reflective coatings, such as silica particles available from Degussa under the brand names ACEMATT. These matting agents can be untreated $SiO_2$ particles of 3-4 microns mean size (by TEM). Wax treated particles of $SiO_2$ are generally less effective and may not be at all effective if sufficiently wax coated. Matting agents function by making the surface microscopically rougher, thereby scattering light from the surface at a variety of angles rather than in a particular direction. The size of the matting agent particle can be adjusted to work on the substrate that will be coated.

The precursors are selected to be easily dissolved in the polymer resin matrix, which should act to aid formation of the silica particles. It will be obvious to those skilled in the art that other resins than polyurethane-type resins may be used as the "curing" polymer, e.g polyvinyl alcohol, etc. Also other curing agents such as borax (sodium borohydrate), and solvents, e.g. ethyl acetate may also be added to the polymer to speed the time of reaction or help the formation of particles. The polymer simply has to act to facilitate a reaction of the precursor material. For example, polyethylene or polypropylene glycols and other polymers with alcohol groups would be expected to be good candidates as polymers. Other resin systems include methacrylates, acrylates, mixed urethane acrylate systems, epoxys, phenolic resins, polyesters, alkylated polyether polyols. It is also known in the art that high solids resins are easier to work with in creating a matted surface and in the present invention the largest synergistic effects of matting agent and alkoxysilanes are found for resins tending to very high solids or low solvent content.

The silica particles in polymer compositions made by the present invention have a number of potentially useful properties. The silica precursor in paper coating resin compositions has excellent anti-gloss and anti-reflection characteristics, and can be used with radiation cure resins in paper coating processes.

The process for adding the above described precursor into the resin is simple addition and mixing since it is a low viscosity liquid. This is a significant advantage compared to other processes for forming coatings with a like amount of particles and resulting properties of particles. Since direct addition of a suitable amount of particle powder to the resins requires considerably more energy of mixing due to thickening and will likely require processes such as milling and/or solvent addition in order to make a usable resin if it is even possible. Compared to many other processes the process and composition herein for preparing resins with silica particles/nanoparticles also produces excellent uniform dispersion of the particles which gives a better surface appearance to finished coatings and objects.

The present invention provides a process for a low gloss polymer coating consisting essentially of the steps of selecting a polymeric resin from the group comprising a polyurethane resin, a derivitized polyurethane resin, a polyurethane acrylate resin, an acrylic resin, a polyvinyl ester resin, a polyvinyl chloride resin, a polyester resin and combinations thereof. A precursor solution is formed by adding a matting agent comprising from 0.1 to 10 microns average size of a non-coated silica to a low viscosity liquid silica material selected from the group consisting of an tetraethyllorthosilicate, an alkoxysilane, a tetramethylorthosilicate, a tetrapropylorthosilicate, a tetrabutylorthosilicate, a sol-gel, and combinations thereof and mixing thoroughly. The precursor solution is added to the resin in an amount of from 0.1 to 40% by weight. The polymeric resin containing the precursor solution is cured producing a low gloss coating ranges from 8-20 gloss units at an angle of 60 degrees when measured by a Rhopoint NOVO-HAZE hazemeter at ambient temperature and pressure, by applying heat, by applying radiation or combinations thereof.

Optionally, one or more can be added to the present invention with the selection based on the change in the polymer/resin resulting in a change in the surfactant chemistry. Dispersants including surfactants act as wetting agents in aqueous formulations, stabilizing pigment dispersions and controlling foam formation. The main function of dispersant is to reduce the surface tension of a solution which is important in both the production and application of the coating.

The term "surfactant" in the instant invention refers to any chemical compound that reduces surface tension of a liquid when dissolved into it, or reduces interfacial tension between two liquids, or between a liquid and a solid. It is usually, but not exclusively, a long chain molecule comprised of two moieties: a hydrophilic moiety and a lipophilic moiety. The "hydrophilic" and "lipophilic" moieties refer to the segment in the molecule with affinity for water, and that with affinity for oil, respectively. It is a broad term that covers all materials that have surface activity, including wetting agents, dispersants, emulsifiers, detergents and foaming agents, etc. The term "dispersant" in the instant invention refers to a surfactant added to a to medium to promote uniform suspension of extremely fine solid particles, often of colloidal size. The term "dispersant" is general accepted to describe the long chain oil soluble or dispersible compounds. These two terms are mostly interchangeable in the instant invention; however, in some cases the term "dispersant" is used with the tendency to emphasize, but not restrict to, the ones commonly used in the lubricant industry.

Anionic surfactants include alkyl, /allkyl, and (al'k'l) the monovalent radical formed when an aliphatic hydrocarbon loses one hydrogen atom. The alkyl includes the sulfates, alcohol sulfates, fatty alcohol and fatty alcohols and are any variety of alcohols derived from plant or animal oils and fats including ether sulfates, sulfonates, and sulfosuccinates, and various blends. Fatty alcohol ethoxylates, alkyl phenol is also anionic surfactant.

In coating formations, the surfactants form micelles when the critical micelle concentration is reached and these spherical aggregates coat the pigment particles and cause them to repel one another providing increased stability to the dispersion. The surfactants also help determine the size of the particles which effects color intensity, shade, and light fastness.

Polysiloxanes and modified polyacrylates provide enhanced performance capabilities. Dispersants commonly contain an lipophilic hydrocarbon group and a polar functional hydrophilic group. The polar functional group can be of the class of carboxylate, ester, amine, amide, imine, imide, hydroxyl, ether, epoxide, phosphorus, ester carboxyl, anhydride, or nitrile. The lipophilic group can be oligomeric or polymeric in nature, usually from 70 to 200 carbon atoms to ensure oil solubility. Hydrocarbon polymers treated with various reagents to introduce polar functions include products prepared by treating polyolefins such as polyisobutene first with maleic anhydride, or phosphorus sulfide or chloride, or by thermal treatment, and then with reagents such as polyamine, amine, ethylene oxide, etc.

Dispersants which may be used include N-substitued polyisobutenyl succinimides and succinates, allkyl methacrylate-vinyl pyrrolidinone copolymers, alkyl methacrylate-dialkylaminoethyl methacrylate copolymers, alkylmethacrylate-polyethylene glycol methacrylate copolymers, and polystearamides. Dispersants from the chemical classes of alkylsuccinimide, succinate esters, high molecular weight amines, MANNICH base and phosphoric acid derivatives. Some specific examples are polyisobutenyl succinimide-polyethylenepolyamine, polyisobutenyl succinic ester, polyisobutenyl hydroxybenzyl-polyethylenepolyamine, bis-hydroxypropyl phosphorate. The dispersant may be combined with other additives used in the industry to form a "dispersant" additive package.

Also the kind of matting agent and resin will command the kind of surfactant/dispersant to be used. For instance, TEOS itself can be a silicone type surfactant. The choice of surfactant or dispersant will be based on the kind of matting agent and resin to be used. The TEGO 685 dispersant in Example 16 is a polyester derivative. Other suitable dispersants include e TEGO 655, TEGO 652, and BORCHI 451 an acrylic block copolymer. The BORCHI dispersant is a non ionic polyurethane oligomer. The TEGO 685 has been most effective in keeping particles from settling although the gloss is higher when we use the dispersants.

Dispersants derived from polymers with alcohol groups, methacrylates, acrylates, mixed urethane acrylate systems, epoxys, phenolic resins, polyesters, alkylated polyether polyols are good candidates for the present invention.

The dispersants are added in an amount of up to 5 percent by weight, more preferably in an amount of from 0.01 percent to 5 percent by weight, more preferably from 0.1 to 1 percent by weight based on the total weight of the formulation.

More particularly, TEGO 685 is has a high polymeric character which aids in stabilizing the particles without adding a resin component. It is available from Degussa and is a high molecular weight polymer forming a free-flowing clear liquid. It is a crosslinkable, acrylate-functional additive for energy curing formulations. It is a surface control additive that improves slip, substrate wetting, scratch resistance, flow and leveling. It is easy to dissolve in monomers, monomer/oligomer resin blends.

With respect to the above description, it is to be realized that the optimum recipe for the parts of the invention to include variations in silica precursor materials, type, solubility parameters, form, and whether it is predissolved in water or some other solvent, as well as the selection of the curing polymer, are dependent upon the particular application to achieve rapid formation of microparticles and nanoparticles.

EXAMPLES

Various other objects, features and attendant advantages of the present invention will become fully appreciated as the same becomes better understood when considered in conjunction with the accompanying examples:

Example 1

A designed experiment was conducted with different amounts of TEOS, matting agent (DEGUSSA ACEATT TS 100), and a selected acrylate type UV cure resin that cures to 100% solids. A coating of each solution was prepared on paper using an RDS number 3 coating rod to produce a coating thickness of approximately 0.25 mil and the coating was UV cured for 30 seconds with a PANACOL-ELOSOL UV-H255 instrument at a wavelength of 300-400 nm. Gloss was measured with a Rhopoint NOVO-HAZE hazemeter on 6 locations, which were averaged to produce the Avg. Gloss reading. Only solutions containing both TEOS and matting agent produced low (<20) haze.

| Solution | Resin | TEOS | Matting Agent | Avg. Gloss |
|---|---|---|---|---|
| 1-1 | 5 g | 0 | 0 | 90 |
| 1-2 | 4 g | 1 g | 0.1 g | 14 |
| 1-3 | 5 g | 1 g | 0 | 89 |
| 1-4 | 4 g | 1 g | 0 | 90 |
| 1-5 | 4 g | 0 | 0 | 89 |
| 1-6 | 4.5 g | 0.5 g | 0.05 g | 30 |
| 1-7 | 5 g | 1 g | 0 | 90 |
| 1-8 | 5 g | 1 g | 0.1 g | 8 |
| 1-9 | 4 g | 1 g | 0.1 g | 9 |
| 1-10 | 4 g | 0 | 0 | 88 |
| 1-11 | 5 g | 0 | 0.1 g | 44 |
| 1-12 | 5 g | 0 | 0 | 90 |
| 1-13 | 4 g | 0 | 0.1 | 44 |
| 1-14 | 4 g | 1 g | 0 | 85 |
| 1-15 | 5 g | 1 g | 0.1 g | 9 |
| 1-16 | 5 g | 0 | 0.1 g | 50 |
| 1-17 | 4 g | 0 | 0.1 | 47 |

Example 2

The results from example 1 above were compared to solutions made with no TEOS but with increasing concentrations of the same matting agent in the same resin. A coating of each solution was prepared on paper using an RDS number 3 coating rod to produce a coating thickness of approximately 0.25 mil and the coating was UV cured for 30 seconds with the same instrument and method of example 1. Haze was measured with a Rhopoint NOVO-HAZE hazemeter on 6 locations, which were averaged to produce the Avg. Haze reading. Using matting agent alone it was possible to make a low gloss coating (Solution 2-2, 2-3) but the coating was impractical in that it was much too viscous (paste or gel like consistency).

| Solution | Resin | Matting Agent | Avg. Gloss | Viscosity |
|---|---|---|---|---|
| 2-1 | 2 g | 0.04 g | 52 | acceptable |
| 2-2 | 2 g | 0.08 g | 7 | viscous |
| 2-3 | 2 g | 0.12 g | 15 | very viscous |
| 2-4 | 2 g | 0.16 g | NA | solidified |
| 2-5 | 2 g | 0.2 g | NA | solidified |

Example 3

A number of solutions were prepared using either TEOS or Sol gel or combinations thereof with and without a small amount of the same matting agent from examples 1 and 2. In every case the silica precursors (TEOS or sol gel) were added to 5 g of the same resin used in examples 1 and 2 and the coating and curing procedure employed were also the same as in example 1. Solutions containing a combination of one of the precursors with matting agent gave much lower gloss than solutions with just matting agent or solutions without the combination of matting agent and precursor.

| Solution | TEOS | Sol Gel | Matting Agent | Avg. Gloss |
|---|---|---|---|---|
| 3-1 | 0 | 0 | 0 | 90 |
| 3-2 | 0 | 0.25 g | 0 | 74 |

-continued

| Solution | TEOS | Sol Gel | Matting Agent | Avg. Gloss |
|---|---|---|---|---|
| 3-3 | 0.86 g | 0 | 0 | 84 |
| 3-4 | 0 | 0 | 0.05 g | 78 |
| 3-5 | 0.86 g | 0.25 g | 0 | 65 |
| 3-6 | 0 | 0.25 g | 0.05 g | 19 |
| 3-7 | 0.86 g | 0 | 0.05 g | 20 |
| 3-8 | 0.86 g | 0.25 g | 0.05 g | 18 |

It is also the case that a variety of particles that are not shown to be matting agents do not work to form the effective precursor of this invention for low gloss coatings. Examples are provided below, showing no improvement of the combination of TEOS and sol gel silica alone.

Example 4

The solutions of example 3, after mixing the precursor with the resin, i.e. as prepared in example 3, were stored at 100° F. for 48 hours. Coating procedure and gloss measurement were conducted on the stored samples and showed that some incremental gloss reduction was achieved, suggesting some type of physical or chemical reaction was slowly taking place in the resin with precursor components. Thus storing resin with any of the precursor ingredients (e.g. TEOS alone) may help to form a low gloss coating, while it is less practical than formulating the full precursor (TEOS/matting agent):

| Solution | Avg. Gloss of Fresh (example 3) | Avg. Gloss of Stored |
|---|---|---|
| 4-3-2 | 74 | 43 |
| 4-3-3 | 84 | 36 |
| 4-3-4 | 78 | 54 |
| 4-3-5 | 65 | 21 |
| 4-3-6 | 19 | 18 |
| 4-3-7 | 20 | 10 |
| 4-3-8 | 18 | 10 |

Example 5

The precursor (solution 5-3 was compared to matting agent alone or TEOS alone as an additive to a two part thermal cure resin containing about 50% solvent. The same coating technique was used but on aluminum panels. The resin is a melamine acrylic/polyurethane. It was observed on this very diluted resin the precursor had only a small advantage over the matting agent alone, probably due to the low solids content.

| Solution | TEOS | Resin p1 | Resin p2 | Matting Agent | Avg. Gloss |
|---|---|---|---|---|---|
| 5-1 | 0 | 1.5 g | 0.5 g | 0.02 g | 75 |
| 5-2 | 0.35 g | 1.5 g | 0.5 g | 0 | 235 |
| 5-3 | 0.35 g | 1.5 g | 0.5 g | 0.02 g | 68 |
| 5-4 | 0 | 1.5 | 0.5 | 0 | 236 |

Example 6

In this example the precursor is heated neat on glass slides to examine the potential for making transparent silica films, potentially useful in optical applications such as solar cells, etc. The precursor was spread on glass with a pipette and subsequently heated to 100° C. for 15 minutes. Films from 6-3 and ethanol (EtOH) dilutions thereof looked promising to make good transparent films with better coating techniques than spreading with a pipette. Furthermore, various dispersing, wetting and spreading agents could be added to facilitate an improved coating.

| Solution | TEOS | Matting Agent | Result |
|---|---|---|---|
| 6-1 | 1 g | 0.05 g | discarded, too thick |
| 6-2 | 5 g | 0.2 g | powdery film |
| 6-3 | 5 g | 0.1 g | thin partially transparent film, some powder |
| 6-4 | 6-3 diluted to 50% EtOH | | improved, still some powder |
| 6-5 | 6-3 diluted to 75% EtOH | | improved, less powder |
| 6-6 | 6-3 diluted to 95% EtOH | | thin partially clear, very little powder |

Example 7

In this example the precursor was tested in a one part high temperature cure resin. The resin-precursor mixture was coated using a #3 rod on an aluminum panel and then cured at 140° C. for 30 min.

| Solution | TEOS | Resin. | Matting Agent | Avg. Gloss |
|---|---|---|---|---|
| 7-1 | 0.86 g | 10 g | 0.05 g | 98 |
| 7-2 | 0 | 10 g | 0 | 236 |
| 7-3 | 0 | 5 g | 0.025 g | 109 |
| 7-4 | same as 7-1 but coated with #6 rod | | | 93 |
| 7-5 | same as 7-2 but coated with #6 rod | | | 236 |
| 7-6 | same as 7-3 but coated with #6 rod | | | 105 |

Example 8

In this example the precursor was tested in a two part urethane room temperature cure resin. The resin-precursor mixture was coated using a #3 rod onto an aluminum panel and then cured for seven days at room temperature before measuring gloss.

| Solution | TEOS | Resin p1 | Resin p2 | Matting Agent | Avg. Gloss |
|---|---|---|---|---|---|
| 8-1 | 0.86 g | 6 g | 2 g | 0.05 g | 112 |
| 8-2 | 0 | 3 g | 1 g | 0 | 231 |
| 8-3 | same as 8-1 but coated with #6 rod | | | | 97 |
| 8-4 | same as 8-2 but coated with #6 rod | | | | 230 |
| 8-5 | 0 | 3 g | 1 g | 0.025 g | 122 |
| 8-6 | same as 8-5 but coated with #6 rod | | | | 105 |
| 8-7 | 0.43 g | 3 g | 1 g | 0 | 231 |
| 8-8 | same as 8-7 but coated with #6 rod | | | | 230 |

Example 9

Use of nanosize aluminum oxide. In this case the sol gel used was not freshly prepared as in examples 1-3, but had been aged approximately 48 hours, which has some beneficial effect on gloss reduction, as has been shown in example 4. The precursor mixtures below (various mixtures of TEOS, Sol Gel and $Al_2O_3$) were added in every case to 5 g of the UV curable resin from example 1 and the same coating procedure was used. The TEOS/sol gel combination gives the best gloss reduction, in contrast to $Al_2O_3$ particles which appear to have no interaction with the precursor and no gloss reducing benefit on their own.

| Solution | TEOS | Sol Gel | Al3 Particle | Avg. Gloss |
|---|---|---|---|---|
| 9-1 | 0 | 0.25 g | 0 | 71 |
| 9-2 | 0.86 | 0 | 0 | 62 |
| 9-3 | 0 | 0 | 0.05 | 82 |
| 9-4 | 0.86 | 0.25 | 0 | 48 |
| 9-5 | 0 | 0.25 | 0.05 | 73 |
| 9-6 | 0.86 | 0 | 0.05 | 76 |
| 9-7 | 0.86 | 0.25 | 0.05 | 58 |

Example 10

An experiment was conducted with different amounts of TEOS, matting agent (Degussa Acematt TS 100), and an acrylate type UV cure resin that cures to 100% solids. A coating of each solution was prepared on aluminum using an RDS number 3 coating rod to produce a coating thickness of approximately 0.25 mil and the coating was UV cured for 30 seconds with a Panacol-Elosol UV-H255 instrument at a wavelength of 300-400 nm. Gloss was measured with a Rhopoint NOVO-HAZE hazemeter on 6 locations, which were averaged to produce the Avg. Gloss reading. Only solutions containing both TEOS and matting agent produced low (<100) gloss.

| Solution | Resin | TEOS | Matting Agent | Avg. Gloss |
|---|---|---|---|---|
| 10-1 | 5 g | 0 | 0 | 212 |
| 10-2 | 5 g | 1 g | 0 | 188 |
| 10-3 | 4 g | 1 g | 0 | 196 |
| 10-4 | 5 g | 0 | 0.1 g | 148 |
| 10-5 | 5 g | 1 g | 0.1 g | 92 |

Example 11

An experiment was conducted with different amounts of TEOS, matting agent (DEGUSSA ACEMATT HK400), and an acrylate type UV cure resin that cures to 100% solids. A coating of each solution was prepared on aluminum using an RDS number 3 coating rod to produce a coating thickness of approximately 0.25 mil and the coating was UV cured for 30 seconds with a PANACOL-ELOSOL UV-H255 instrument at a wavelength of 300-400 nm. Gloss was measured with a Rhopoint NOVO-HAZE hazemeter on 6 locations, which were averaged to produce the Avg. Gloss reading. A modest reduction in haze was observed when TEOS and ACEMATT HK400 were added to the resin as opposed to ACEMATT HK400 alone.

| Solution | Resin | TEOS | Matting Agent | Avg. Gloss |
|---|---|---|---|---|
| 11-1 | 5 g | 0 | 0.05 g | 43 |
| 11-2 | 5 g | 0.86 g | 0.05 g | 35 |

Other negative examples were proven, including the use of nanosize titanium dioxide, nanosize zinc oxide and various silicas which are not matting agents, e.g. AEROSIL R972 from Degussa and R9200, R8200, silicas from Degussa. In order to interact synergistically with the precursor to reduce gloss it is necessary to use a particle with matting agent properties.

Example 12

An experiment was conducted with and without TEOS, matting agent (DEGUSSA ACEMATT 3300), and an acrylate type UV cure resin that cures to 100% solids. A coating of each solution was prepared on paper using an RDS number 3 coating rod to produce a coating thickness of approximately 0.25 mil and the coating was UV cured for 30 seconds with a PANACOL-ELOSOL UV-H255 instrument at a wavelength of 300-400 nm. Gloss was measured with a Rhopoint NOVO-HAZE hazemeter on 6 locations, which were averaged to produce the Avg. Gloss reading. A modest reduction in haze was observed when TEOS and ACEMATT 3300 were added to the resin as opposed to ACEMATT 3300 alone.

| Solution | Resin | TEOS | Matting Agent | Avg. Gloss |
|---|---|---|---|---|
| 12-1 | 5 g | 0 | 0.05 g | 35 |
| 12-2 | 5 g | 0.86 g | 0.05 g | 26 |
| 12-3 | 2.5 g | 0.86 g | 0.025 g | 23 |
| 12-4 | same as 12-1 but aged 3 days before coating | | | 28 |
| 12-5 | same as 12-2 but aged 3 days before coating | | | 19 |

Example 13

An experiment was conducted with and without TEOS, matting agent (Degussa ACEMATT HK440), and an acrylate type UV cure resin that cures to 100% solids. A coating of each solution was prepared on paper using an RDS number 3 coating rod to produce a coating thickness of approximately 0.25 mil and the coating was UV cured for 30 seconds with a PANACOL-ELOSOL UV-H255 instrument at a wavelength of 300-400 nm. Gloss was measured with a Rhopoint NOVO-HAZE hazemeter on 6 locations, which were averaged to produce the Avg. Gloss reading. A significant reduction in haze was observed when TEOS and ACEMATT HK440 were added to the resin as opposed to ACEMATT HK440 alone.

| Solution | Resin | TEOS | Matting Agent | Avg. Gloss |
|---|---|---|---|---|
| 13-1 | 5 g | 0 | 0.05 g | 74 |
| 13-2 | 5 g | 0.86 g | 0.05 g | 44 |
| 13-3 | same as 13-1 but aged 3 days before coating | | | 48 |
| 13-4 | same as 13-2 but aged 3 days before coating | | | 28 |
| 13-5 | same as 13-1 but coating is thermal cured at 60° C. | | | 37 |
| 13-6 | same as 13-2 but coating is thermal cured at 60° C. | | | 48 |
| 13-7 | resin alone but coating is thermal cured at 60° C. | | | 44 |

Example 14

An experiment was conducted with and without TEOS, matting agent (Degussa ACEMATT TS 100), and a urethane (meth)acrylate type UV cure resin, Dymax 9-20557 that cures to 100% solids. A coating of each solution was prepared on paper using an RDS number 3 coating rod to produce a coating thickness of approximately 0.25 mil and the coating was UV cured for 30 seconds with a PANACOL-ELOSOL UV-H255 instrument at a wavelength of 300-400 nm. Gloss was measured with a Rhopoint NOVO-HAZE hazemeter on 6 locations, which were averaged to produce the Avg. Gloss reading. A significant reduction in haze was observed when TEOS and TS 100 were added to the resin as opposed to TS 100 alone

| Solution | Resin | TEOS | Matting Agent | Avg. Gloss |
|---|---|---|---|---|
| 14-1 | 5 g | 0.86 g | 0.05 g | 23 |
| 14-2 | 5 g | 0 | 0.05 g | 48 |
| 14-3 | 5 g | 0.86 g | 0 | 89 |
| 14-4 | 5 g | 0 | 0 | 85 |

Example 15

An experiment was conducted with and without TEOS, matting agent (Degussa ACEMATT TS100), and a urethane-(meth)acrylate type UV cure resin, Dymax 984-LVUF that cures to 100% solids. This resin is lower in viscosity than in example 14. A coating of each solution was prepared on paper using an RDS number 3 coating rod to produce a coating thickness of approximately 0.25 mil and the coating was UV cured for 30 seconds with a PANACOL-ELOSOL UV-H255 instrument at a wavelength of 300-400 nm. Gloss was measured with a Rhopoint NOVO-HAZE hazemeter on 6 locations, which were averaged to produce the Avg. Gloss reading. A significant reduction in haze was observed when TEOS and TS100 were added to the resin, although TS 100 alone was almost as good.

| Solution | Resin | TEOS | Matting Agent | Avg. Gloss |
|---|---|---|---|---|
| 15-1 | 5 g | 0.86 g | 0.05 g | 15 |
| 15-2 | 5 g | 0 | 0.05 g | 21 |
| 15-3 | 5 g | 0.86 g | 0 | 83 |
| 15-4 | 5 g | 0 | 0 | 91 |

The foregoing detailed description is given primarily for clearness of understanding and no unnecessary limitations are to be understood therefrom, for modifications will become obvious to those skilled in the art based upon more recent disclosures and may be made without departing from the spirit of the invention and scope of the appended claims.

We claim:

1. A nonaqueous low gloss coating comprising from 0.1 to 40% of a low viscosity liquid precursor composition comprising a cross-linking solvent selected from the group consisting of a liquid alkoxide, a liquid alkoxysilane, a liquid tetraethylorthosilicate, a tetramethylorthosilicate, a tetrapropylorthosilicate, a 3-(glycoxypropyl) trimethoxysilane, a tetrabutylorthosilicate, a liquid silica sol gel, and combinations thereof, and containing a silica powder matting agent soluble in said cross-linking solvent, said silica powder matting agent comprising from 0.1 to 10 microns average size of a non-coated silica in an amount of from 0.01 to 1% based on the total weight of the formulation wherein upon curing by the application of heat, said low viscosity liquid precursor forms a low gloss coating film ranging from 8-20 gloss units at an angle of 60 degrees when measured by a Rhopoint NOVO-HAZE hazemeter.

2. The low gloss coating of claim 1, further comprising a resin selected from the group consisting of a polyurethane resin, a derivitized polyurethane resin, a polyurethane acrylate resin, an acrylic resin, a methacrylate resin, an acrylate resin, a mixed urethane acrylate resin, an epoxy resin, a phenolic resin, an alkylated polyether polyol resin, a polyurethane resin, a derivitized polyurethane resin, an acrylate UV curable resin, a polyvinyl ester resin, a polyvinyl chloride resin, a polyester resin and combinations thereof.

3. The low gloss coating of claim 1, wherein said silica particles in said precursor solution comprise particles in the size range of from 1-40 nm.

4. The low gloss coating of claim 1, said low viscosity liquid precursor composition including trace elements of rhodium, cobalt, nickel, gold, silver, platinum, copper, aluminum, and combinations thereof.

5. The low gloss coating of claim 1, including a dispersant in an amount of from 0.01 to 5 percent by weight based on the total weight of the formulation.

6. The low gloss coating of claim 5, wherein said dispersant is selected from the group consisting of a silicone surfactant, a polyester derivative, an acrylic copolymer, a nonionic polyurethane oligomer, and combinations thereof.

7. The low gloss coating of claim 5, wherein said dispersant is selected from the group of dispersants derived from polymers with alcohol groups, methacrylates, acrylates, mixed urethane acrylate systems, epoxys, phenolic resins, polyesters, alkylated and polyether polyols and combinations thereof.

8. A nonaqueous low gloss coating comprising from 0.1 to 40% of a low viscosity liquid precursor composition comprising a cross-linking solvent selected from the group consisting of a liquid alkoxide, a liquid alkoxysilane, a liquid tetraethylorthosilicate, a tetramethylorthosilicate, a tetrapropylorthosilicate, a 3-(glycoxypropyl) trimethoxysilane, a tetrabutylorthosilicate, a liquid silica sol gel, and combinations thereof; and containing a silica powder matting agent soluble in said cross-linking solvent, said silica powder matting agent comprising from 0.1 to 10 microns average size of a non-coated silica in an amount of from 0.01 to 1% based on the total weight of the formulation
and
a polymeric resin selected from the group consisting of a polyurethane resin, a derivitized polyurethane resin, a polyurethane acrylate resin, an acrylic resin, a polvinyl ester resin, a polyurethane acrylate resin, a methacrylate resin, an acrylate resin, a mixed urethane acrylate resin, an epoxy resin, a phenolic resin, an alkylated polyether polyol resin, a polyurethane resin, a derivitized polyurethane resin, an acrylate UV curable resin, a polyvinyl chloride resin, a polyester resin and combinations thereof;
wherein upon curing said low gloss coating ranges from 8-20 gloss units at an angle of 60 degrees when measured by a Rhopoint NOVO-HAZE hazemeter.

9. A nonaqueous low gloss coating, consisting essentially of:
from 0.1 to 40% of a low viscosity liquid precursor composition comprising a cross-linking solvent selected from the group consisting of a liquid alkoxide, a liquid alkoxysilane, a liquid tetraethylorthosilicate, a tetramethylorthosilicate, a tetrapropylorthosilicate, a 3-(glycoxypropyl) trimethoxysilane, a tetrabutylorthosilicate, a liquid silica sol gel, and combinations thereof; and a silica powder matting agent soluble in said cross-linking solvent, said silica powder matting agent comprising from 0.1 to 10 microns average size of a non-coated silica in an amount of from 0.01 to 1% based on the total weight of the formulation, wherein upon curing by the application of heat, said low viscosity liquid precursor forms a low gloss coating film ranging from 8-20 gloss units at an angle of 60 degrees when measured by a Rhopoint NOVO-HAZE hazemeter.

10. A nonaqueous low gloss coating, comprising:
from 0.1 to 40% of a low viscosity liquid precursor composition comprising a cross-linking solvent selected from the group consisting of a liquid alkoxide, a liquid alkoxysilane, a liquid tetraethylorthosilicate, a tetramethylorthosilicate, a tetrapropylorthosilicate, a 3-(glycoxypropyl) trimethoxysilane, a tetrabutylorthosilicate, a liquid silica sol gel, and combinations thereof; and a silica powder matting agent soluble in said cross-linking solvent, said silica powder matting agent comprising from 0.1 to 10 microns average size of a non-coated silica in an amount of from 0.01 to 1% based on the total weight of the formulation;

a polymeric resin selected from the group consisting of a polyurethane resin, a derivitized polyurethane resin, a polyurethane acrylate resin, an acrylic resin, a polyvinyl ester resin, a polyvinyl chloride resin, a polyester resin and combinations thereof;

a dispersant in an amount of from 0.01 to 5 percent by weight based on the total weight of the formulation, said dispersant is selected from the group consisting of a silicone surfactant, a polyester derivative, an acrylic copolymer, a nonionic polyurethane oligomer, polymers with alcohol groups, methacrylates, acrylates, mixed urethane acrylate systems, epoxys, phenolic resins, polyesters, alkylated and polyether polyols and combinations thereof;

trace elements of rhodium, cobalt, nickel, gold, silver, platinum, copper, aluminum, and combinations thereof; and wherein upon curing said nonaqueous low gloss coating ranges from 8-20 gloss units at an angle of 60 degrees when measured by a Rhopoint NOVO-HAZE hazemeter.

* * * * *